July 3, 1934.                P. PORTER                1,965,510
                            SPIKE ROLLER
                    Filed April 28, 1933        2 Sheets-Sheet 1
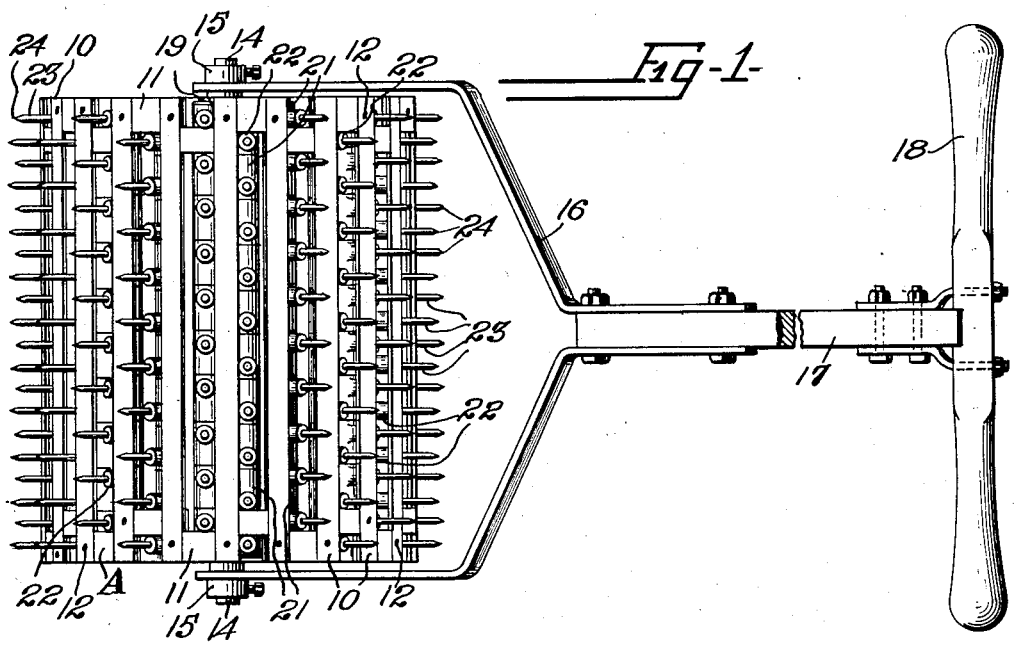
Fig-1-
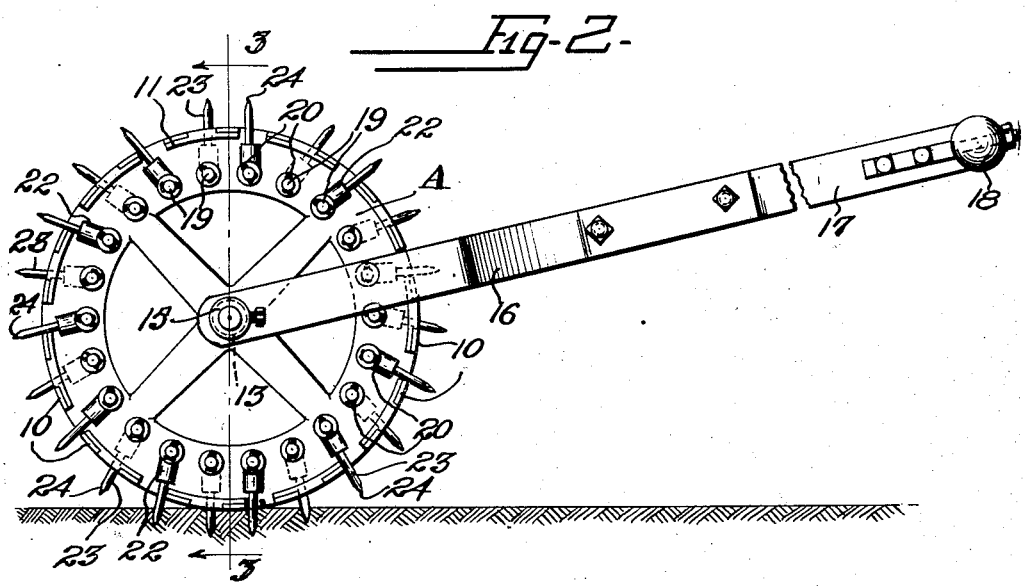
Fig-2-
Philip Porter,
INVENTOR
BY Victor J. Evans & Co.
ATTORNEY July 3, 1934.                P. PORTER                1,965,510
                             SPIKE ROLLER
                       Filed April 28, 1933       2 Sheets-Sheet 2
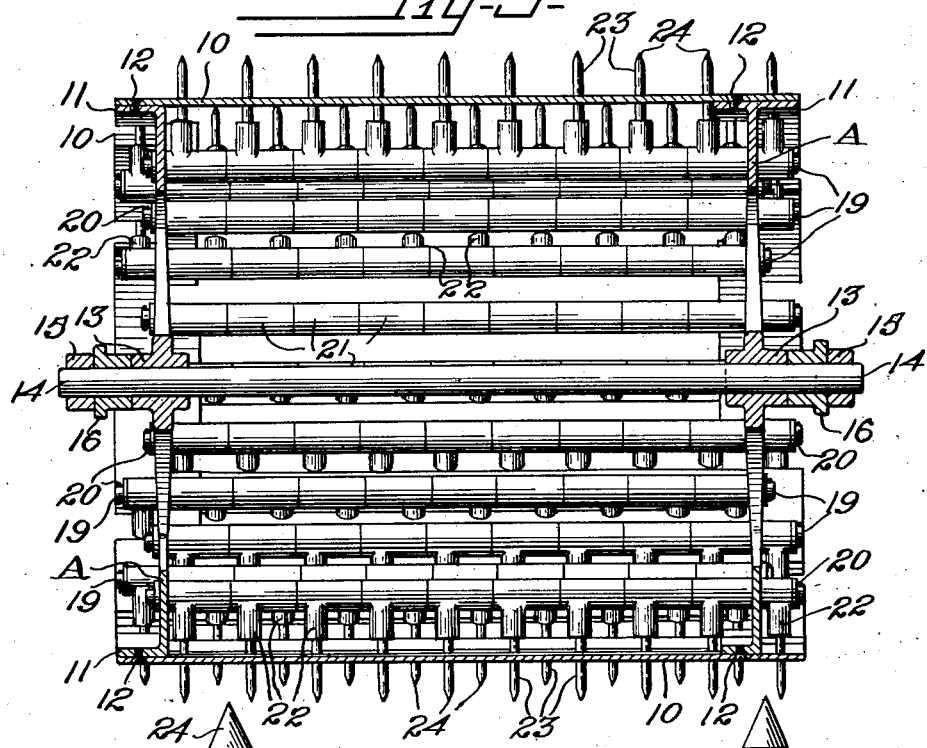
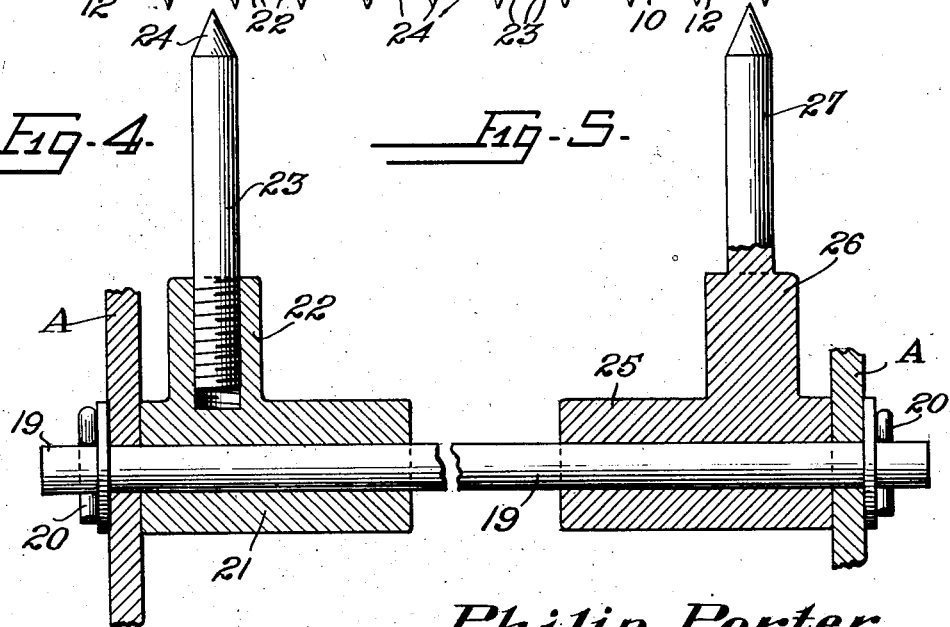
Philip Porter,
                                    INVENTOR
                        BY
                                    ATTORNEY Patented July 3, 1934

1,965,510

UNITED STATES PATENT OFFICE 1,965,510

SPIKE ROLLER

Philip Porter, East Northfield, Mass.

Application April 28, 1933, Serial No. 668,450

5 Claims. (Cl. 97—52)

The invention relates to a spike roller and more especially to a combined harrow and roller.

The primary object of the invention is the provision of an implement of this character, wherein a skeleton roller has fitted therein swinging spikes, these coacting with the roller so that a ground surface can be worked without unduly tearing up the surface as the spikes are self-adjustable for penetrating the ground and the extraction thereof under the rolling action of the implement, the spikes being mounted in a novel manner in the implement.

Another object of the invention is the provision of an implement of this character, wherein the spikes of the same are readily removable from the roller so that in event of the breakage of any of the spikes the same can be replaced with dispatch and by reason of the construction of the implement a ground surface can be properly worked with a minimum friction as the spikes of the implement are automatically adjustable both for penetration of the ground and extraction therefrom during the rolling action of said implement.

A further object of the invention is the provision of an implement of this character which is simple in construction, thoroughly reliable and efficient in its operation, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a top plan view of the implement constructed in accordance with the invention.

Figure 2 is a side elevation thereof.

Figure 3 is an enlarged sectional view on the line 3—3 of Figure 2 looking in the direction of the arrows.

Figure 4 is a fragmentary vertical sectional view through a spike mounting.

Figure 5 is a view similar to Figure 4 showing a slight modification of the spike and mounting.

Similar reference characters indicate corresponding parts throughout the several views in the drawings.

Referring to the drawings in detail, the implement comprises a skeleton cylinder A constituting a roller and includes a series of spaced parallel bars 10 and spoked end heads 11, the bars 10 being disposed circumferentially about the end heads 11 and countersunk in the peripheries thereof. It is preferable to have the bars 10 made secure to the heads 11 through the medium of fasteners 12 so that a rigid cylinder is obtained.

The end heads 11 are formed with center hubs 13 receiving an axle 14 which is detachably secured in bearings 15 of a fork 16 for a handle bar 17 having at its free end a cross handle 18.

Removably fitted in the end heads 11 concentrically with respect to the rotary axis of the roller are spaced parallel rods 19, each being held in place preferably through the use of cotter pins 20. Thus it will be seen that each rod 19 is susceptible of convenient removal from the roller with dispatch.

Swingingly supported on the respective rods 19 are spike mountings, each in the form of a sleeve 21 having a boss 22, these mountings being arranged side by side between the end heads 11 as is clearly apparent from Figure 3 of the drawings. Detachably threaded in each boss 22 is a harrow spike 23 having the pointed free end 24. These spikes when in the mountings 21 protrude between the bars 10 of the roller and are self-adjustable so that the same, under the rolling action of the implement, will become perpendicular when penetrating the ground and by reason of the swinging action they will readily become extracted from the ground on the travel of the roller upon its surface. The action of the spikes 23 under the rolling action of the implement is clearly disclosed in Figure 2 of the drawings.

By reason of the mountings 21 for the spikes, in event of breakage of any or all of the same, they can be readily replaced with dispatch.

In Figure 5 of the drawings there is shown a slight modification wherein the mounting 25 has integrally formed with its stud 26 the spike 27, this mounting 25 being fitted with the rod 19 identical to the mounting 21.

It should be obvious that the mountings 21 and 25 may be reversed on the rods 19 and in this fashion altering the staggered disposition of the spikes 23 and 27 within the roller of the implement.

What is claimed is:

1. In an implement of the character described, a hollow cylindrical roller having a slatted tread, the slats of the tread being disposed uniformly spaced circumferentially of the roller and flush with the outer periphery of said roller, rods concentrically disposed with respect to the axis of the roller and journaled in the ends of the latter to be disposed close to and at the spaces between the slats, sleeves fitting said rods and disposed end to end in contacting relation to each other, spikes on said sleeves and working through the spaces between the slats at the tread of said roller, and a handle bar having a center journal for the said roller, the spaces between the slats being of a size to permit angular change of the spikes within the limits of the widths of the spaces between said slats.

2. A turf roller comprising a cylinder having a tread surface provided with transverse slots, and spikes mounted interior to the roller and protruding through the slots, said spikes having pivotal mountings to permit swinging movement in limited arcs determined by the width of the slots, whereby the spikes are moved gravitationally to angular positions from the radial as they approach the ground in the rotation of the roller.

3. A turf roller comprising a cylinder having a tread surface provided with transverse slots, and spikes mounted interior to the roller and protruding through said slots, said spikes having pivotal mountings in radial planes lying in the longitudinal center lines of said slots to permit swinging movement in limited arcs determined by the width of the slots, whereby the spikes are moved gravitationally to angular positions from the radial as they approach the ground in either direction of rotation of the roller.

4. A turf roller comprising a cylinder having a tread surface provided with transverse slots, rods arranged within the roller in a circular series concentric with the roller, sleeves mounted on said rods in end abutting relation but for independent angular or turning movement on said rods, and spikes carried by and radially projecting from said sleeves and passing through said slots to drop gravitationally against one edge of the slots when they approach the ground in the rotation of the roller and to drop against the other edge of the slots as they leave the ground.

5. A turf roller comprising a cylinder having a tread surface provided with transverse slots, rods arranged within the roller in a circular series concentric with the roller and having their axes disposed in radial planes passing through the longitudinal center lines of said slots, sleeves mounted upon said rods in end abutting relation but for independent angular or turning movement on said rods, and spikes carried by said sleeves and projecting radially therefrom and passing through said slots for movement gravitationally in limited arcs determined by the width of said slots so as to approach the ground in a position at the same angle to the radial irrespective of the direction of movement of the cylinder over the ground.

PHILIP PORTER.